United States Patent [19]

Ishida et al.

[11] Patent Number: 4,761,951
[45] Date of Patent: Aug. 9, 1988

[54] PARTICULATE EXTRACTION ARRANGEMENT FOR AUTOMOTIVE TURBOCHARGER OR THE LIKE

[75] Inventors: Noboru Ishida; Norio Kato; Mitsuyoshi Kawamura, all of Nagoya, Japan

[73] Assignee: NGK Spark Plug Co., Ltd., Nagoya, Japan

[21] Appl. No.: 97,142

[22] Filed: Sep. 16, 1987

[30] Foreign Application Priority Data

Sep. 17, 1986 [JP] Japan .................. 61-141336[U]

[51] Int. Cl.$^4$ .................. F02B 37/00; F01N 3/02
[52] U.S. Cl. .................. 60/280; 55/454;
 55/462; 55/467; 55/DIG. 30; 60/600; 60/602;
 60/614; 415/121 H; 415/168
[58] Field of Search .................. 60/280, 600, 602, 614;
 55/454, 462, 467, DIG. 14, DIG. 30; 415/121
 A, 168

[56] References Cited

U.S. PATENT DOCUMENTS 2,431,563 11/1947 Johansson .................. 60/602
3,274,757 9/1966 Wapler .................. 415/168
3,907,671 9/1975 Baigas .................. 55/454
3,951,626 4/1976 Carey .................. 60/280
3,971,218 7/1976 Toth .................. 60/602
4,041,569 8/1977 Petersen .................. 55/462

FOREIGN PATENT DOCUMENTS 113211 6/1984 Japan .................. 415/168
941532 11/1963 United Kingdom .................. 60/280

Primary Examiner—Douglas Hart
Attorney, Agent, or Firm—Foley & Lardner, Schwartz, Jeffery, Schwaab, Mack, Blumenthal & Evans

[57] ABSTRACT

In order to remove particulate matter from the exhaust gases which flow into the turbine impeller scroll of a internal combustion engine turbocharger, a separator which settles or centrifugally separates the solids from the gases is disposed between the engine manifold and the turbocharger. The separator is arranged to communicate with the turbocharger waste gate so that collected particulate matter is carried out of the device when the valve is opened to vent excessive back pressure.

5 Claims, 2 Drawing Sheets

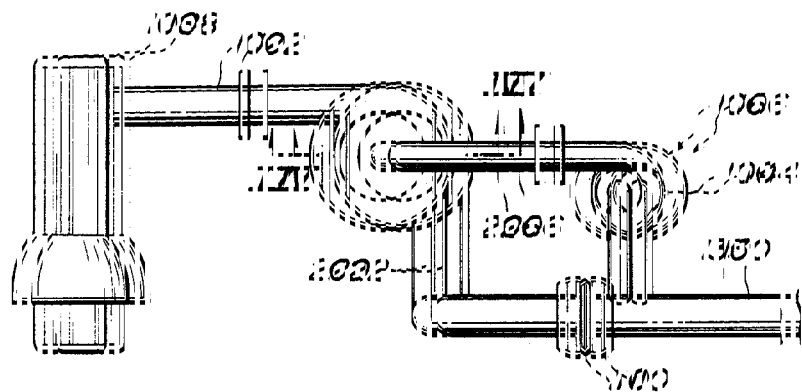
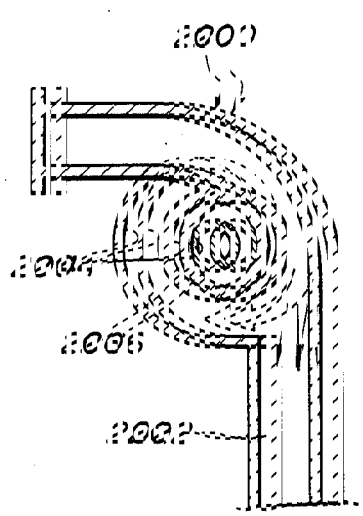
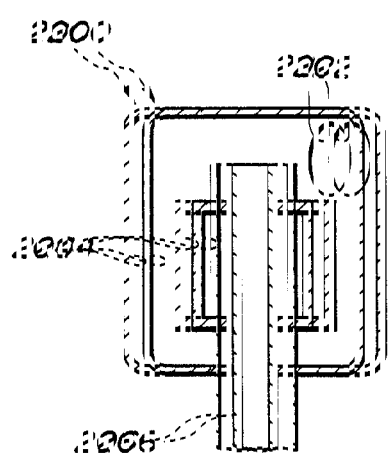

PARTICULATE EXTRACTION ARRANGEMENT FOR AUTOMOTIVE TURBOCHARGER OR THE LIKE

BACKGROUND OF THE INVENTION

1. Field of the Invention

The present invention relates generally to an automotive turbocharger and more specifically to an arrangement used in combination therewith which removes particulate matter from the exhaust gases prior entry into the turbocharger scroll.

2. Description of the Prior Art

In order to improve the response and efficiency of automotive turbochargers it has been proposed to use ceramic and thinwall lightweight metal components in the construction thereof. However, a drawback has been encountered in that deposits and acidic materials produced in the combustion chamber and the exhaust manifold during the operation of the engine tend to accumulate and dislodged from time to time under the influence of the engine vibration. This particulate matter is subsequently carried into the turbocharger by the exhaust gas flow and tends to chip and damage the blades of the ceramic impellers and/or deform the metal rotor. Further, this matter tends to deposit in the scroll and build-up in the interior of the turbocharger in a manner which reduces the rotational power and the pressure developed by the device.

SUMMARY OF THE INVENTION

It is an object of the instant invention to provide a particulate separation arrangement for an automotive turbocharger or the like which enables the collection of the soiling and/or abrasive particles prior entry into the interior of the turbocharger scroll.

In brief, the above object is achieved by an arrangement wherein a separator which settles or centrifugally separates the solids from the gases is disposed between the engine manifold and the turbocharger. The collection section of the separator is arranged to communicate with the turbocharger waste gate so that collected particulate matter is carried out of the device each time the valve is opened to vent excessive back pressure.

More specifically, the present invention takes the form of an internal combustion engine system which features: an exhaust manifold; a turbocharger having a scroll into which exhaust gas from the engine is introduced; a valve for selectively by-passing exhaust gases from the manifold around the scroll into an exhaust conduit; and a particulate separation device operatively interposed between the exhaust manifold, the scroll and the valve, the separation device comprising: a chamber; a first port which establishes fluid communication between the chamber and the manifold; a second port, the second port establishing fluid communication between the chamber and the scroll; and a third port, the third port establishing fluid communication between the chamber and the exhaust conduit via the valve, the chamber including means for inducing particulate matter which is carried thereinto from the manifold through the first port to separate from the exhaust gases and gravitate toward the third port and for inducing particulate matter free exhaust gases to pass through the second port.

BRIEF DESCRIPTION OF THE DRAWINGS

FIGS. 3 and 4 shown in plant and elevation a second embodiment of the present invention; and FIG. 5 is a sectional view taken along section line V—V of FIGS. 3; and FIG. 6 is a sectional view taken along section line VI—VI of FIG. 4.

DETAILED DESCRIPTION OF THE PREFERRED EMBODIMENTS

Figure 1:
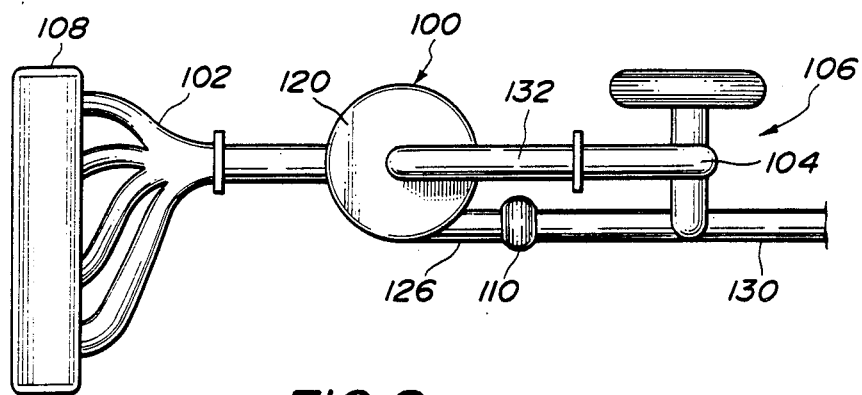
FIGS. 1 and 2 shows in schematic plan and elevation a first embodiment of the present invention.
Figure 2:
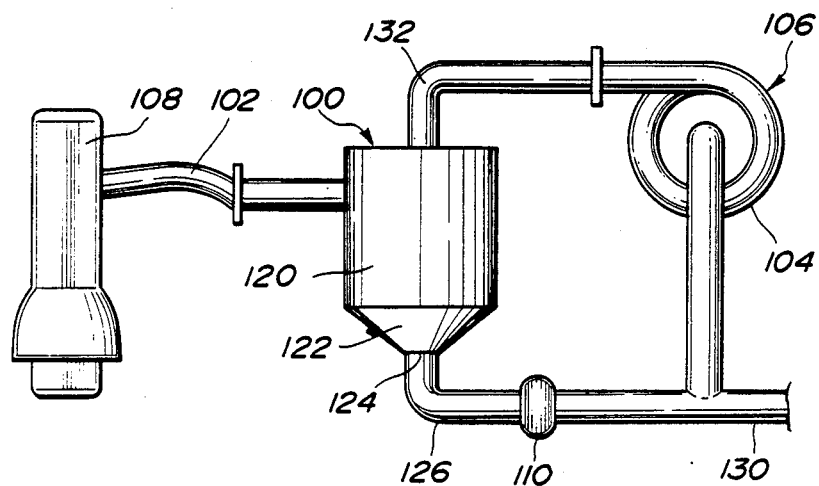
Figure 3:
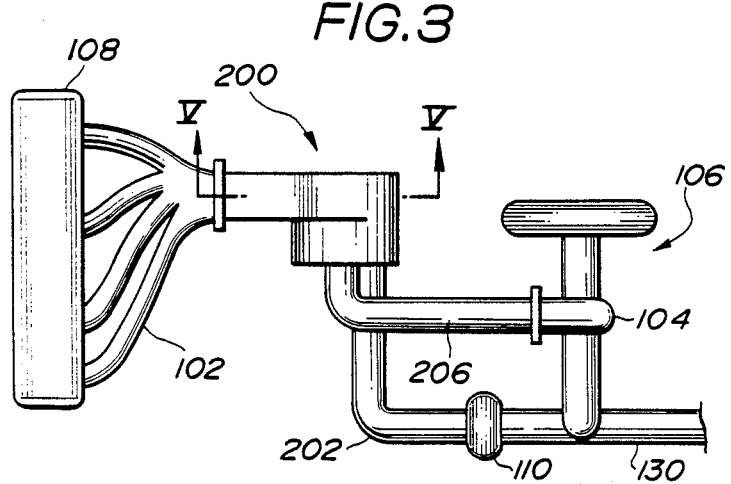

FIGS. 1 and 2 show a first embodiment of the present invention. In this arrangement (not drawn to scale) a particulate matter separating device 100 is operatively disposed between the exhaust manifold 102 and the scroll 104 of the turbocharger 106 which is associated with the engine 108. In this arrangement the turbocharger 106 is of a fixed capacity type which is equipped with a waste gate valve 110 to by-pass the excess exhaust gases and obviate the formation of excessive back pressures in the exhaust manifold 102.

In this arrangement the separator 100 includes an essentially cylindrical separation tank 120 has a frustro conical shaped lower section 122 which terminates in a particle discharge opening 124. A discharge conduit 126 leads from the discharge opening 124 to the waste gate valve 110 via which the excessive exhaust gases which tend to be produced by the engine from time to time are vented to the ambient atmosphere via the exhaust pipe 130 and muffler (not shown).

With this arrangement when carbon particles and or similar deposits are dislodged from the engine combustion chambers, exhaust valves and the like and/or when scale and or acidic material which as formed via corrosion on the inner walls of the exhaust manifold 102 are dislodged and are entrained in the exhaust gas flow, as the flow enters the cylindrical separator the particles, which have assumed the velocity of the gas flow and by their nature have a density higher than the exhaust gases, tend to fly through the separator 100 and impinge on the inner wall thereof. As the velocity of the exhaust gas flow lowers in the separator, the particles which have lost a lot of their kinetic energy due to the collision with the separator wall tend not be re-entrained therein and fall under the influence of gravity toward and into the frustro conical shaped lower section 122. The particles free exhaust gases flow out through the top of the separator to the scroll 104 of the turbo charger 106 via a transfer conduit 132.

Upon opening of the waste gate valve 110 in response to the presence of exhaust pressures above a predetermined level, the collected particulate matter is flushed out of the separator 100 into the exhaust pipe 130 by the fraction of the exhaust gases which are able to flow through the waste gate valve 110 under such circumstances via conduit 126.

FIGS. 3 to 6 show a second embodiment of the present invention. In this arrangement the exhaust gases are fed tangentially into a separator 200 so that the gases tend to flow along a helical path, due to the coanda effect, such as shown by the bold arrow in FIG. 5 while the particulate matter tends to fly tangentially off into a collection conduit 202 (as shown by the solid line arrows) which leads to the waste gate valve 110. Any particulate matter not subject to the initial "centrifugal" separation tends to impinge on the inner surface of the helical shaped wall 204 of the separator 200 arrangement and thus separate out of the gas flow before it actually enters a transfer conduit 206 which leads to the scroll 104 of the turbocharger 106.

In both of the embodiments of the present invention it is deemed advantageous to form the transfer conduits 132, 206 which transfers the exhaust gases from the separator to the turbocharger scroll 104 to either of a ceramic material or a stainless steel (or similar metal corrision and heat resistant metal).

The embodiments of the present invention subject to tests utilizing a 2000 cc displacement engine equipped with a turbocharger having a 60 mm diameter ceramic rotor turbine impeller. The engine was operated in manner to simulate a 0 to 100 Km/hr vehicle acceleration. Even after this test was continued for 1000 cycles still the impellers showed no notable sign of deterioration.

As will be appreciated the combination of the separator with the waste gate valve uniquely provides for the emptying of the device each time the waste gate valve is opened. This reduces the size and service demands of the device in that the collected particulate matter is automatically removed from time to time.

What is claimed is:

1. In an engine system
   an exhaust manifold;
   a turbocharger having a scroll into which exhaust gas from said engine is introduced;
   a valve for selectively by-passing exhaust gases from said manifold around said scroll into an exhaust conduit; and
   a particulate separation device operatively interposed between said exhaust manifold, said scroll and said valve, said separation device comprising;
   a chamber;
   a first port which establishes fluid communication between said chamber and said manifold;
   a second port, said second port establishing fluid communication between said chamber and said scroll; and
   a third port, said third port establishing fluid communication between said chamber and said exhaust conduit via said valve;
   said chamber including means for inducing particulate matter which is carried thereinto from said manifold through said first port to separate from the exhaust gases and gravitate toward said third port and for inducing particulate matter free exhaust gases to pass through said second port.

2. An engine system as claimed in claim 1 further comprising a transfer conduit which fluidly communicates said second port with said scroll, said transfer conduit being formed of a corrosion resistant material.

3. An engine system as claimed in claim 2 wherein said chamber has an essentially cylindrical shape and wherein said first port is oriented to direct the flow of exhuast gases directly through said chamber toward a cylindrical wall thereof.

4. An engine system as claimed in claim 2 wherein said chamber has an essentially cylindrical shape and said first port is arranged to introduce the exhaust gases tangentially into said chamber in a manner which tends to induce a helical flow pattern, said third port being arranged to receive particulate matter which tends to fly tangentially off from the exhaust gases which have assumed the helical flow pattern.

5. An engine system as claimed in claim 2, wherein said chamber has an essentially cylindrical shape and said second port is arranged to essentially coaxially with the cylindrical axis of the chamber.

* * * * *